Aug. 15, 1967  E. KLINGEL ETAL  3,335,841
METHOD AND APPARATUS FOR FEEDING ARTICLES
TO A PACKAGING MACHINE
Filed March 11, 1966  2 Sheets-Sheet 2

United States Patent Office 3,335,841
Patented Aug. 15, 1967

3,335,841
METHOD AND APPARATUS FOR FEEDING ARTICLES TO A PACKAGING MACHINE
Erwin Klingel, Josef Denk, and Hans Bertsch, all of Heerstrasse, Postfach 118, 705 Waiblingen, near Stuttgart, Germany
Filed Mar. 11, 1966, Ser. No. 534,993
10 Claims. (Cl. 198—34)

ABSTRACT OF THE DISCLOSURE

An apparatus for moving articles at certain distances from each other onto a continuously moving transporting conveyer of an operating machine, the apparatus comprising a feed conveyer arranged to move articles placed at random spacings thereon onto the transporting conveyer, a control conveyer having a run extending substantional parallel to a portion of the feed conveyer in carrying a plurality of driving members spaced said certain distance from each other, the driving members being arranged on the run so as to tend to move from an inoperative position to an operative position adapted to act upon an article on the feed conveyer, drive means for driving the control conveyer with a speed different from that of the feed conveyer, guide means extending along a portion of the run of the control conveyer and engaging the drive members for maintaining the same in the inoperative position, the guide means having at least one section movable from a first position located in the path of the drive members to a second position located out of the path so as to permit the drive members to move to the operative position, moving means connected to the movable section for moving the same between the first and the second position, actuating means for actuating the moving means, and stationary sensing means arranged along the feed conveyor for sensing the position of articles thereon as the latter pass by the sensing means, and connected to the actuating means for controlling the latter in dependence on the position of an article sensed.

---

The present invention relates to a method and an apparatus for feeding articles to a packaging machine.

In continuously operating packaging machines which are supplied with the articles to be packed by means of special feeding mechanisms, it is of the greatest importance for the proper operation of the packaging machine that the articles will always pass into this machine at equal distances from each other and at such a speed that the transfer from the feeding mechanism to the packaging machine will occur without any interference. This means that the articles while being fed must be spaced from each other and conveyed toward the packaging machine in accordance with the spacing between the conveying receptacles of this machine and the speed thereof.

In many cases it is, on the one hand, practically impossible to connect the driving means of the feeding mechanism mechanically directly to the driving means of the packaging machine and, on the other hand, it occurs frequently that the articles will not be fed at equal distances from each other to the packaging machine. This means that the packaging machine and the feeding mechanism might run at different speeds and that the spacing between the articles in the feeding mechanism might not coincide with the spacing between the conveying receptacles of the packaging machine and that therefore the transfer of the articles to the packaging machine will not occur properly and the packaging machine itself will also function improperly.

Although with some types of articles it might be possible to overcome these disadvantages by feeding the articles so as to collect on a barrier and then to separate them by suitable means at uniform intervals from each other and to transfer them at such equal intervals to the packaging machine, this method cannot be applied if the articles are relatively soft and may be deformed when the running against each other. Typical examples of such articles are bags, tubes, cubes of margarine, etc.

It is an object of the present invention to provide a method of feeding articles on a continuously movable conveyer, then to transfer them from this conveyer at a certain distance from each other to a packaging machine, and to do this even though the feeding conveyer and the packaging machine may be driven at different speeds and even though the individual articles arrive on the feeding conveyer near the packaging machine at different distances from each other.

According to the invention, this object may be attained by providing an additional endless control conveyer which is driven by the packaging machine and operatively associated with the feeding conveyer and mounted in a fixed position relative thereto is adapted to act upon the articles arriving on the feeding conveyer in a manner so as to accelerate or slow down their movement by varying their speed relative to that of the feeding conveyer so that the articles will then be transferred into the conveying receptacles of the packaging machine at a spacing from each other in accordance with the spacing between the successive conveying receptacles and at a speed in accordance with the speed of these receptacles.

A preferred feature of the invention consists in providing the additional control conveyer in the form of an endless chain which is movable within a vertical plane and carries a plurality of driving members which are spaced at equal distances from each other and are adapted to slide along a guide rail which consists of several individual sections and is located above and extends for a certain distance along the belt of the feeding conveyer. Each of these driving members will leave the guide rail in accordance with its association at the particular time with one of the articles by dropping downwardly for a limited distance. The respective driving member will then act upon the associated article and move the same at the speed as required by the packaging machine and, if necessary, also shift to the proper position as required for transferring the article into one of the conveying receptacles of the packaging machine.

These and further features of the invention will become more clearly apparent from the following detailed description thereof which is to be read with reference to the accompanying diagrammatic drawings, in which:

FIGURE 2 shows a detail view of a part of the feeding belt and the control conveyer in the position after the control magnet has been energized; while

Figure 1:
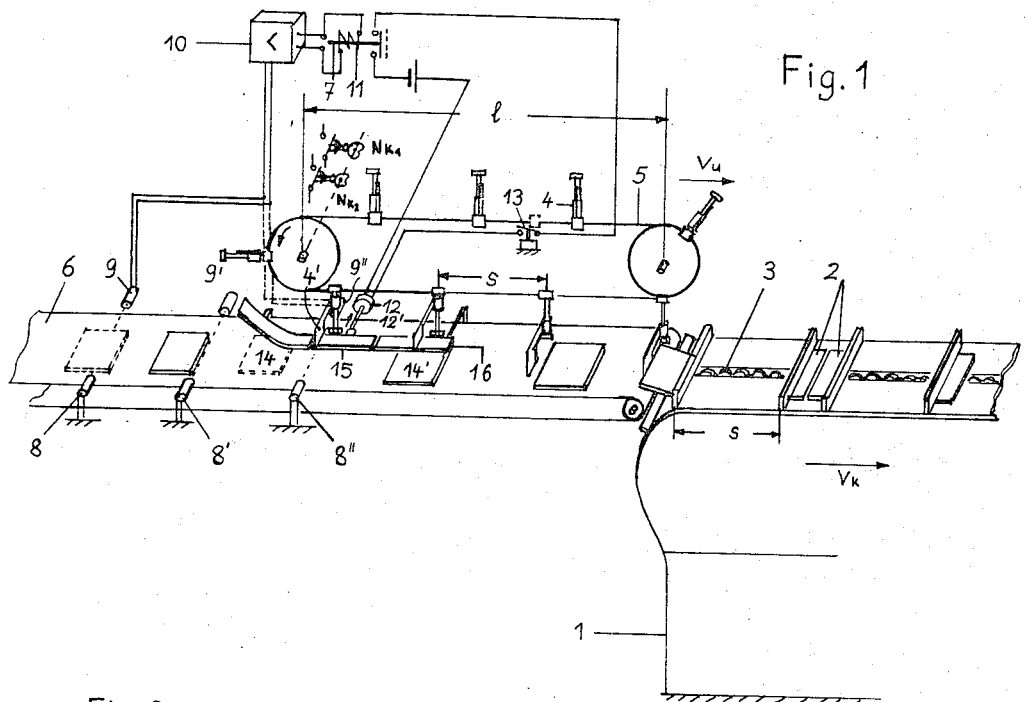
FIGURE 1 shows a perspective view of an apparatus for carrying out the method according to the invention.

FIGURE 1 of the drawings illustrates a part of a cartoning machine 1 which comprises a plurality of conveying receptacles 2 which are connected to and driven by a continuously movable chain 3 and each of which consists of two parts and is spaced at a distance $s$ from the adjacent receptacle.

The endless control conveyer according to the invention comprises a chain 5 which is provided with driving members 4 and is connected to the cartoning machine so as to be driven at the same speed as this machine. The driving members 4 on chain 5 are spaced from each other at the same distance $s$ as the conveying receptacles 2.

The feeding belt 6 may be provided with separate driving means, although it may also be driven by the cartoning machine or by the control conveyer 5 at a certain speed ratio relative to this machine and to the control conveyer. The speed ratio may also be adjustable by a suitable speed governor.

Adjacent to the upper side of the feeding belt 6 a light barrier 8, 9 is provided which consists of a light transmitter and a light receiver at the opposite sides of the belt and is connected in series with a photoelectric amplifier 10. This amplifier 10 is connected to a relay 11 which is adapted to control the circuit of the control magnet 12 which is also controlled by means of a key contact 13. The light barrier 8, 9 may be adjustable to different positions in the direction of movement of the feeding belt 6 (for instance position 8″, 9″). Frequently it is also advisable to provide a second light barrier 8′, 9′ at a certain distance from the first light barrier.

The manner of operation of the apparatus according to the invention is as follows;

The articles to be packed, for example, in the form of packages or bags 14, which are placed automatically or manually at certain intervals upon the feeding belt 6 pass individually through the light barrier 8, 9. At the passage of each package or bag 14 the light beam will be interrupted for a certain length of time, whereby an electric impulse will be produced which, possibly after suitable transformation, is amplified and then energizes the relay 11 so that its armature 7 will be pulled up.

Figure 7:
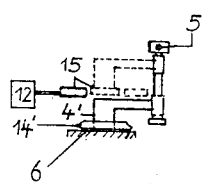
FIGURE 7 is a view of the feeding belt according to FIGURE 2 taken along the line A–B whereby the control magnet 12 is turned round 180°.
Figure 8:
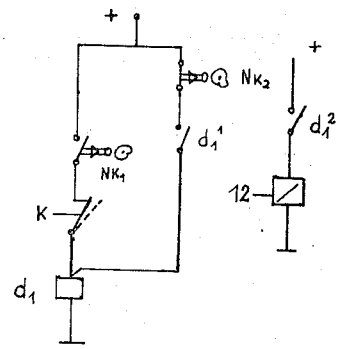
FIGURE 8 is a circuit of the control system for the ejector magnet.
Figure 3:
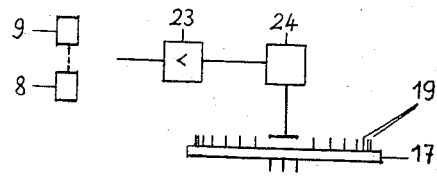
FIGURES 3 to 6 show parts of another apparatus for carrying out the method according to the invention, in which this apparatus is provided with a storage drum, as seen in a side view and a top view in FIGURES 3 and 4, respectively.
Figure 4:
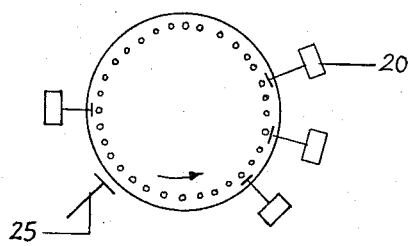
Figure 5:
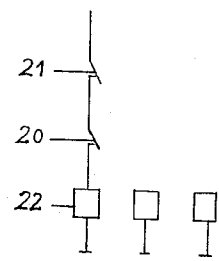
Figure 6:
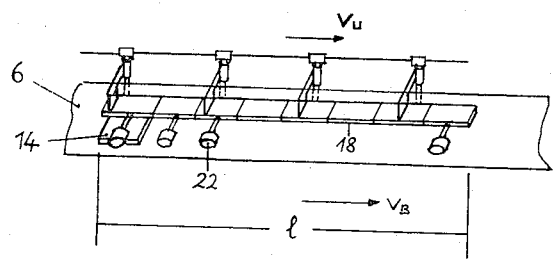

If, as indicated in FIGURE 1 in dotted lines, the key contact 13 is closed at this particular time, for example, by the supporting member of a driving pin 4, and if a suitable difference in speed has been set between the two conveyers 5 and 6 and the light barrier is disposed in the proper position, a driving pin 4′ will already be in engagement with the rail section 15 before a package or bag 14 which is conveyed along the belt 6 has reached the end surface of this rail section. Since the relay 7, 11 is energized and the key contact is still closed, the current will then flow through the winding of the control magnet 12 so that the rail section which is connected to the armature 12′ will be drawn back transversely to the conveying direction, as shown particularly in the FIGURES 2 and 7, and will thereby permit the driving pin 4′ to drop downwardly for a limited distance and to pass into the space between the two adjacent packages or bags 14 and 14′.

Figure 2:
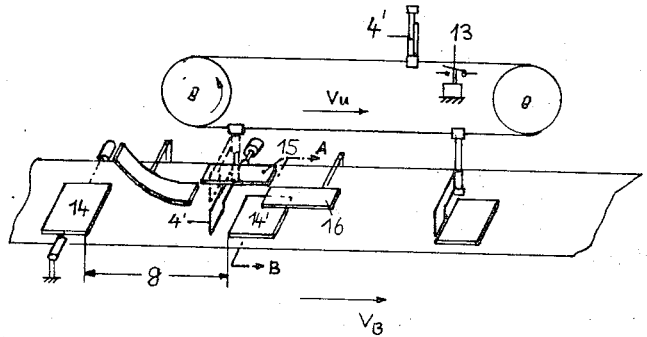

When the apparatus is in the particular position as illustrated in FIGURE 2, the driving pin 4′ has just left the key contact 13 and the package 14′ has already passed beyond the rail section 15.

If the speed $V_u$ of the control conveyer 5 is greater than the speed $V_B$ of the feeding belt 6, the driving pin 4′ will catch up with the package or bag 14′ on its way toward the cartoning machine 1 and shift the package or bag forwardly and finally at the required speed $V_u$ into the next conveying receptacle 2 of the cartoning machine which runs at a speed $V_K$ which is equal to the speed $V_u$.

If $V_u$ is smaller than $V_B$, the packages or bags 14 will run against the driving pins 4 and will thereby be slowed down to the required speed. The insertion of each package or bag into the next conveying receptacle of the cartoning machine is then carried out by the driving pin 4 which engages upon the rear edge of the respective package or bag.

The difference in speed between the feeding belt 6 and the control conveyer 5 or the length of the rail section 16 if the speed ratio between the conveyers 5 and 6 is set are to be determined in such a manner that in the most unsuitable condition when a package or bag 14 just passes the light barrier at the moment when a driving pin leaves the key contact, the respective driving pin leaves the key contact, the respective driving pin will remain on the rail section 15 and will reliably enter into a gap between two adjacent packages when it drops downwardly after leaving the rail 16. After the chain 5 reverses its direction of movement, the driving pins 4 thereon will pivot back to their original positions as the result of their gravity.

FIGURES 3 to 6 illustrate another embodiment of the invention which operates with a storage drum 17 and in which the distance $l$ within which the driving pins may drop downwardly is divided into eight sections 18.

The storage drum 17 is provided with axially movable pins 19 in a circular arrangement and these pins are operatively associated with eight key contacts 20 which are equally spaced from each other. The storage drum 17 is driven by the feeding belt 6 and its circumference is made of a size in accordance with the length of the distance $l$ (speed ratio 1:1). The size of the circumference of the storage drum merely depends upon the length of the distance $l$ or it may be made smaller accordingly.

The apparatus is further provided with a plurality of cam contacts 21 in accordance with the number of rail sections 18. These contacts 21 may be combined within a switch unit which may be driven by the cartoning machine. For releasing the rail sections 18 and thus the driving pins 4, there are eight resetting magnets 22 provided.

The manner of operation of the apparatus according to FIGURES 3 to 6 is as follows:

When the light barrier 8, 9 is interrupted during the passage of a package or bag, an electric impulse is produced which after being amplified by the amplifier 23 energizes the control magnet 24 so that the pins 19 of the storage drum 17 which are then located opposite to the magnet 24 will be shifted in the axial direction.

During the further rotation of the drum, the displaced pins are moved to the first key contact 20. If the associated cam contact is closed at this particular time, the associated release magnet 22 will be actuated which then releases a driving pin 4 so that the latter will drop downwardly. In place of driving pins, it is also possible to employ flaps which are pivotable downwardly. The simultaneous action of a key contact 20 and the associated cam contact 21, which should not last for a longer period than that which a package or bag requires for traveling the distance which is equal to the distance between two adjacent packages or bags, will only occur if the respective driving pin or flap is located between two adjacent packages or bags.

In order to prevent the packages or bags from lagging behind or piling up on each other, it is necessary that the number of conveying receptacles of the cartoning machine which travel along the latter during a certain period of time is equal to or greater than the number of packages or bags which arrive at this machine during this period. The differences in spacing are always compensated during the distance $l$. The minimum length of this distance $l$ may be determined in the case of $V_u > V_B$ from the equation:

$$1 \text{ min.} = S \left[ \frac{\frac{VB}{Vu}}{\frac{1-VB}{Vu}} \right] \cdot \left( \frac{100+Y}{100} \right) \%$$

In this equation, S designates the spacing, $V_B$ the speed of the feeding belt, $V_K$ the speed of the conveying receptacles, and Y the increased output in percent per unit of time.

Assuming that $$V_B = 0.8 V_u, Y = 10\% \text{ and } S = 50 \text{ cm.}$$

it then follows from the equation that $$1 \text{ min.} = 50 \cdot \left( \frac{0.8}{0.2} \right) \cdot 1.1 = 220 \text{ cm.}$$

This is the distance which a driving pin will travel until it catches up with a preceding package or bag.

If $V_u$ is smaller than $V_B$, the following equation applies:

$$1 \text{ min.} = S\left(\frac{V_B}{V_u}\right)\left(\frac{V_B}{V_u} - 1\right)$$

If $S=50$ cm. and $V_B = 1.2 V_u$, the minimum distance of travel amounts to $$1 \text{ min.} = 50 \cdot \left(\frac{1.2}{0.2}\right) = 300 \text{ cm.}$$

The minimum spacing or the minimum distance between the packages or bags is determined in the case of $$\frac{V_B}{V_K} > 0$$

by the equation:

$$g \text{ min.} = \frac{V_B}{V_K} \cdot S = (a+b)$$

in which $a$ is the distance between two adjacent packages or bags and $b$ is the width of each package or bag.

The actual distance between the packages or bags in the case of $$\frac{V_B}{V_K} > 0$$

amounts to $$g = \frac{V_B}{V_K} \cdot S \left(\frac{100 + Y}{100}\right)$$

The minimum distance may not be shortened since otherwise it may occur, for example, that two packages or bags may pass into the same conveying receptacle of the packing machine. If the distance is too small, the respective packages or bags will be automatically eliminated.

In place of photoelectric scanning systems, it is, of course, also generally possible to employ mechanical keying or tracing devices.

It is also possible to control the ejector magnet 12 only by the light barrier 8", 9". For this purpose a relay $d_1$ is provided which gets the control voltage, if the cam contact $NK_1$ is closed and no bag 14 interrupts the light beam. At this time the contact K of the amplifier for the light barrier is closed.

During this time the cam contact $NK_2$ is closed, the relay $d_1$ completes the circuit via the working contact $d_1{}^1$.

If the contact $d_1{}^2$ is closed, the ejector magnet 12 is set in motion.

On the other hand the ejector magnet 12 may be also set in motion if the bag interrupts the light beam. In this case the contact K is in dotted position.

Instead of the rotating cam contacts $NK_1$ and $NK_2$ also electrical key contacts as contact 13 can be used.

The magnet 25 is provided to replace the pins 19.

What we claim is:

1. An apparatus for moving articles at certain distances from each other onto a continuously moving transporting conveyer of an operating machine, said apparatus comprising a feed conveyer arranged to move articles placed at random spacing thereon onto said transporting conveyer; a control conveyer having a run extending substantially parallel to a portion of said feed conveyer and carrying a plurality of driving members spaced said certain distance from each other, said driving members arranged on said run so as to tend to move from an inoperative position to an operative position adapted to act upon an article of said feed conveyer; drive means for continuously driving said control conveyer with a speed different from that of said feed conveyer; guide means extending along a portion of said run of said control conveyer and engaging said drive members for maintaining the same in said inoperative position, said guide means having at least one section movable from a first position located in the path of said drive members to a second position located out of said path so as to permit said drive members to move to said operative position; moving means connected to said movable section for moving the same between said first and said second position; actuating means for actuating said moving means; and stationary sensing means arranged along said feed conveyer for sensing the position of articles thereon as the latter pass by said sensing means and connected to said actuating means for controlling the latter in dependence on the position of an article sensed.

2. An apparatus as defined in claim 1, wherein said run of said control conveyer is arranged above said feed conveyer, wherein said driving members on said run are arranged to move by gravity from said inoperative to said operative position, and wherein said guide means are arranged between said run and said feed conveyer.

3. An apparatus as defined in claim 2, wherein said movable section of said guide means is arranged between two stationary sections.

4. An apparatus as defined in claim 2, wherein said moving means include an electromagnet cooperating with said movable section to move the latter in a direction transverse to the movement of said run of said control conveyer.

5. An apparatus as defined in claim 4, wherein said sensing means comprise a light source and a photoelectric cell respectively arranged on opposite sides of said feed conveyer so that articles moved by said feed conveyer will interrupt a light beam passing from said light source to said photoelectric cell, and said actuating means including a relay in circuit with said electromagnet and controlled by said photoelectric cell.

6. An apparatus as defined in claim 5, wherein said actuating means include an additional switch in circuit with said electromagnet and arranged to be opened and closed by said driving members.

7. An apparatus as defined in claim 2, wherein said guide means comprise a plurality of sections movable between said first and said second position, wherein a moving means is provided for each of said sections for moving the same between said positions thereof, and wherein said actuating means comprise a drum rotatable about its axis and driven by said feed conveyer, a plurality of spaced pins carried by said drum along a circle coaxial with said axis and shiftable in axial direction between an active and an inactive position, shifting means controlled by said sensing means and cooperating with said pins for shifting the same between said positions thereof, and a plurality of contact means, one for each moving means, arranged in the path of and to be moved by said pins, when the same are in said active position, from an open to a closed position to cause in said closed position actuation of the respective moving means to move a respective section of said guide means from said first to said second position.

8. An apparatus as defined in claim 7, wherein said pins are uniformly spaced from each other and said plurality of contact means are arranged uniformly spaced from each other about said drum.

9. An apparatus as defined in claim 8, wherein said sensing means includes a light source and a photoelectric cell arranged on opposite sides of said feed conveyer so that articles moved by the latter will interrupt a light beam passing from said light source to said photoelectric cell, and said shifting means comprise a control magnet controlled by said photoelectric cell, and wherein each of said moving means comprise an electromagnet cooperating with a respective section to move, when energized, the respective section from said first to said second position, said contact means being respectively in circuit with said electromagnets, and an additional contact for each electromagnet and movable from an open to a closed position by engagement with one of said drive members and arranged in circuit with the respective electromagnet so that the latter will be energized only when the respective contact means and the respective additional contact are both in said closed position.

10. An apparatus as defined in claim 9, and including cam means cooperating with said pins for moving the same from said active position to said inactive position during the rotation of said drum about its axis.

References Cited

UNITED STATES PATENTS

| | | | |
|---|---|---|---|
| 3,155,221 | 11/1964 | Griner | 198—34 |
| 3,266,614 | 8/1966 | Griner | 198—3 X |

ANDRES H. NIELSEN, *Primary Examiner.*

EDWARD A. SROKA, *Examiner.*